US012515934B2

(12) United States Patent
Rey

(10) Patent No.: US 12,515,934 B2
(45) Date of Patent: Jan. 6, 2026

(54) EQUIPMENT FOR SEPARATING CAPS FROM THEIR CONDITIONING TRAY

(71) Applicant: A. Raymond et Cie, Grenoble (FR)

(72) Inventor: Gaëtan Rey, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 18/612,945

(22) Filed: Mar. 21, 2024

(65) Prior Publication Data

US 2024/0336467 A1 Oct. 10, 2024

(30) Foreign Application Priority Data

Apr. 7, 2023 (FR) ........................................ 2303537

(51) Int. Cl.
*B67B 3/22* (2006.01)

(52) U.S. Cl.
CPC ........................................ *B67B 3/22* (2013.01)

(58) Field of Classification Search
CPC .......... B67B 3/22; B65B 7/2821; B65B 3/006
See application file for complete search history.

(56) References Cited

U.S. PATENT DOCUMENTS

| | | | | |
|---|---|---|---|---|
| 5,519,984 | A * | 5/1996 | Beussink | B65B 3/003 53/489 |
| 2008/0216312 | A1 * | 9/2008 | Williams | B65B 7/2821 29/773 |
| 2011/0289889 | A1 * | 12/2011 | Kohanski | B01L 3/50853 81/3.4 |
| 2013/0161225 | A1 * | 6/2013 | Lepot | B01L 9/54 206/557 |
| 2017/0081056 | A1 * | 3/2017 | Zambaux | A61M 5/30 |
| 2019/0135462 | A1 * | 5/2019 | Broadbent | B65B 55/027 |

FOREIGN PATENT DOCUMENTS

| | | | |
|---|---|---|---|
| DE | 202017103606 | | 9/2018 |
| EP | 0246577 | A2 | 11/1987 |
| EP | 0815010 | B1 | 5/2001 |
| EP | 3144230 | A1 | 3/2017 |
| EP | 3505458 | A1 | 7/2019 |
| EP | 3536362 | A1 | 9/2019 |
| FR | 3098504 | B1 | 6/2021 |

OTHER PUBLICATIONS

French Search Report for Application No. FR2303537 dated Nov. 28, 2023, 2 pages.

* cited by examiner

*Primary Examiner* — Andrew M Tecco
*Assistant Examiner* — Nicholas E Igbokwe
(74) *Attorney, Agent, or Firm* — TraskBritt

(57) ABSTRACT

Equipment for separating caps from a tray, after the caps have been attached to bottles to seal the latter. The tray comprises a plurality of fastening systems for holding caps on a lower face of the plate, and a through opening centered on each fastening system, the plurality of openings being distributed according to a distribution pattern. The equipment comprises an unclipping plate provided, on a lower face, with rods distributed according to the distribution pattern. The unclipping plate is mobile along a vertical axis, so that each rod can pass through an opening. Some rods, referred to as first rods, have a first length along the vertical axis and other rods, referred to as second rods, have a second length less than the first length.

16 Claims, 5 Drawing Sheets

EQUIPMENT FOR SEPARATING CAPS FROM THEIR CONDITIONING TRAY

PRIORITY CLAIM

This application claims the benefit of the filing date of French Patent Application Serial No. FR2303537, filed Apr. 7, 2023, for "Equipment for Separating Caps From Their Conditioning Tray," the disclosure of which is incorporated herein in its entirety by this reference.

TECHNICAL FIELD

The present disclosure relates to the field of conditioning for pharmaceutical products. In particular, the disclosure relates to equipment for separating caps from a conditioning tray after the caps have been attached to bottles for pharmaceutical use in order to seal the bottles.

BACKGROUND

It is customary for the caps, intended to seal bottles after they have been filled with a product for medical use, to be collectively held by a conditioning tray for their storage, transport and handling before use. This collective conditioning avoids these caps, considered as medical devices, from being contaminated or damaged by contacts and friction between them.

European Patent Application Publication No. EP3505458 proposes this type of conditioning. The caps held by fastening systems on the lower face of a conditioning tray are assembled on bottles, which may also be collectively held by a tray. After assembly, a rod, attached to a plate, is moved downwards so as to pass through an opening provided in the tray of caps, in line with each cap, and to gradually push each cap downwards until they detach from the tray.

The disadvantage that can be encountered when the number of rods is equal to the number of caps is that the force to be applied is significant and tends to damage the tray due to excessive flexing.

The present disclosure proposes a solution that aims to remedy the stated problem. The present disclosure relates to equipment for separating caps collectively held on a conditioning tray, this separation occurring after they have been attached to bottles to seal the bottles. The present disclosure also relates to a method for separating caps and conditioning trays.

BRIEF SUMMARY

The present disclosure relates to equipment for separating caps from a tray, after the caps have been attached to bottles to seal the bottles,

- the tray comprising:
  - a plurality of fastening systems, each fastening system being configured to hold a cap and being arranged on a lower face of the tray, and
  - a through opening centered on each fastening system, the plurality of openings being distributed over the tray according to a distribution pattern,
- the equipment comprising an unclipping plate provided, on a lower face, with rods distributed according to the distribution pattern, the unclipping plate extending along a horizontal plane parallel to an upper face of the tray, and being mobile along a vertical axis, so that each rod can pass through an opening.

The equipment is remarkable in that certain rods, referred to as first rods, have a first length along the vertical axis and other rods, referred to as second rods, have a second length less than the first length.

According to advantageous and non-limiting features of the present disclosure, which can be taken either individually or in any technically feasible combination:

- the first rods are located in a central region of the lower face of the unclipping plate and the second rods are located in a peripheral region;
- the first rods are located in a peripheral region of the lower face of the unclipping plate and the second rods are located in a central region;
- the first and second rods are arranged on the lower face of the unclipping plate according to a uniform distribution relative to one another, and potentially in alternation;
- the first rods represent between 30% and 70% of all the rods;
- the difference between the first length and the second length is between 0.5 mm and 2 mm;
- the equipment comprises a mechanical device for lowering the unclipping plate along the vertical axis, involving a manually actuatable lever, or a controllable pneumatic or electric cylinder;
- the equipment comprises a support for holding the tray parallel to the horizontal plane;
- the support is fixed and makes it possible to keep the tray immobile;
- the support is mobile and makes it possible to apply a vertical movement to the tray toward the unclipping plate;
- the unclipping plate comprises between 9 rods and 100 rods;
- the equipment has several removable and interchangeable unclipping plates, so as to adapt to each type of trays.

The present disclosure also relates to a method for separating caps from a tray, by way of the equipment as mentioned above, comprising the following steps:

a) a collective association of the caps on bottles to seal the latter, each cap being attached to a bottle and also held in the tray, referred to as the first tray, the bottles being held in another tray, called second tray, then, b) a first displacement of the unclipping plate, downwards, along the vertical axis, to a first height to bring the first rods into contact with the upper parts of the caps, then, c) continuing the first displacement of the unclipping plate, downwards, along the vertical axis, the first tray being held immobile and the second tray being able to move vertically, until separation between the caps and the first tray, or c') a second displacement of the first tray, upward, along the vertical axis, the unclipping plate being held immobile at the first height, and the second tray also being held immobile, until the separation between the caps and the first tray.

BRIEF DESCRIPTION OF THE DRAWINGS

Other features and advantages of the present disclosure will emerge from the following detailed description of example embodiments of the present disclosure with reference to the appended figures, in which.

In the description, the same references in the figures may be used for elements of the same type.

DETAILED DESCRIPTION

The present disclosure relates to equipment for separating caps 2 from a conditioning tray 50, after the caps 2 have been attached to bottles 1 to seal the bottles 1.

Figure 1A:
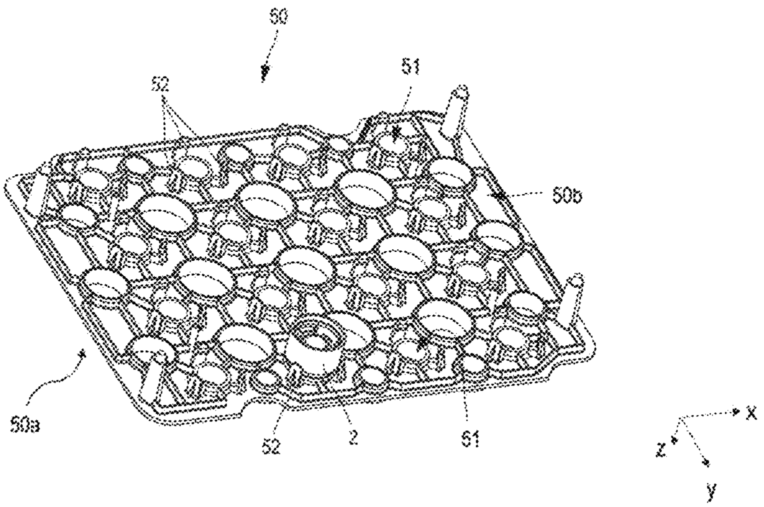
FIGS. 1A and 1B show two examples of conditioning trays for collectively holding caps.

The conditioning tray 50, which holds the caps 2, is referred to herein as the first tray 50 in the rest of the description (FIG. 1A). The first tray 50 has an upper face 50*a* and a lower face 50*b*. A plurality of attachment systems 52 is arranged on the lower face 50*b* of the first tray 50. Each fastening system 52 is configured to hold a cap 2. To facilitate the viewing of the fastening systems 52, a single cap 2 has been shown, attached to the first tray 50, in FIG. 1A; of course, the practice is to have one cap 2 held by each of the attachment systems 52 of the tray 50.

Figure 1B:
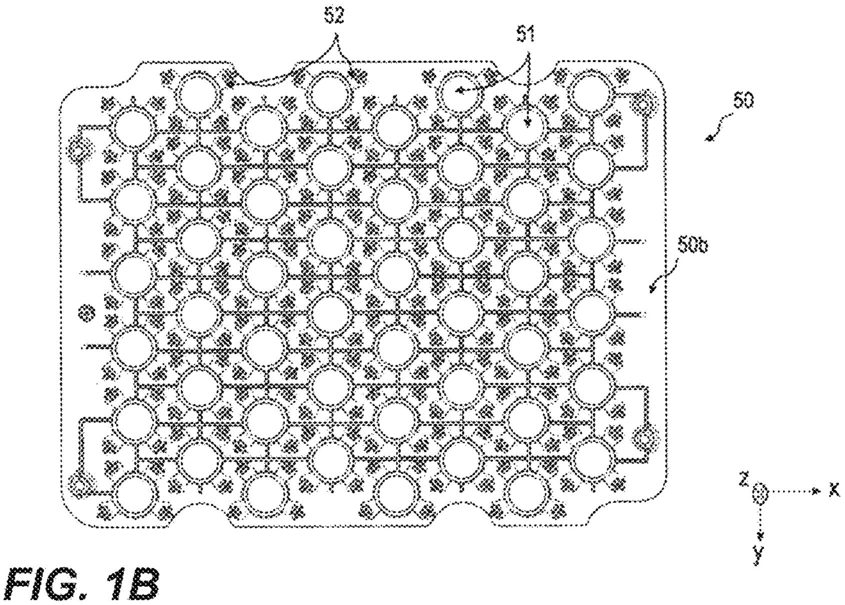

The first tray 50 also comprises a through opening 51, centered on each fastening system 52, the plurality of openings 51 being distributed over the first tray 50 according to a distribution pattern. Two examples of first trays are shown in FIGS. 1A and 1B, showing two different distribution patterns. Of course, many other distribution patterns are possible, depending on the number of attachment systems 52 provided on the tray 50 and their size (depending on the size of the caps 2).

Figure 2:
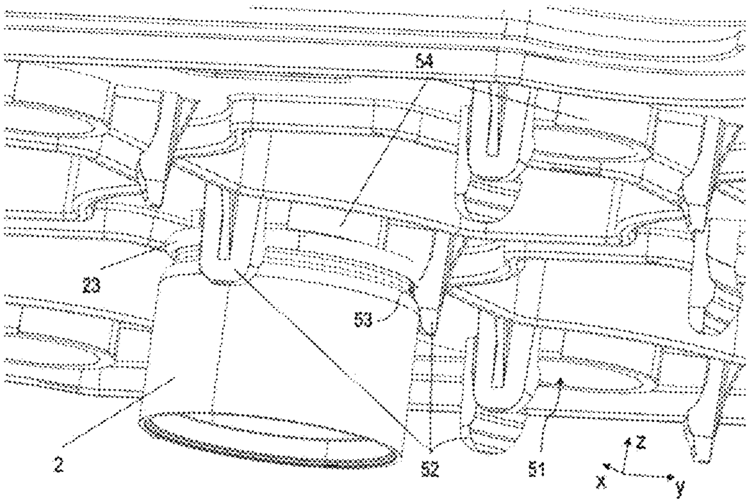
FIG. 2 shows an example of a cap held by a clip-type fastening system, on a conditioning tray.

In FIGS. 1A and 1B, each fastening system 52 corresponds to a clip, formed from a plurality of flexible branches, extending substantially perpendicular to the main plane (x,y) of the first tray 50, and terminated by a claw 53, intended to engage the cap 2, and advantageously an upper part 23 of the cap 2, as shown in FIG. 2. The number of branches may typically be chosen between two, three (FIG. 1A) and four (FIG. 1B). The substantially planar upper surface of the cap 2 also comes into contact against a stop 54 provided on the lower face of the first tray 50. This stop 54 is, for example, annular in shape in the examples of FIGS. 1A and 2.

The fastening systems 52 may be of the clip type, as mentioned above, but may also be of any other type. For example, the caps 2 can be held by clamping in a recess made of deformable material, or by magnetism (it being understood, in the latter case, that the caps will each comprise a magnetic element for cooperating with the associated magnetic fastening system).

Each cap 2 is thus suspended (when the lower face 50*b* of the first tray 50 is oriented downward), vertically (along the z axis in the figures), on the side of the lower face 50*b*.

Figure 3:
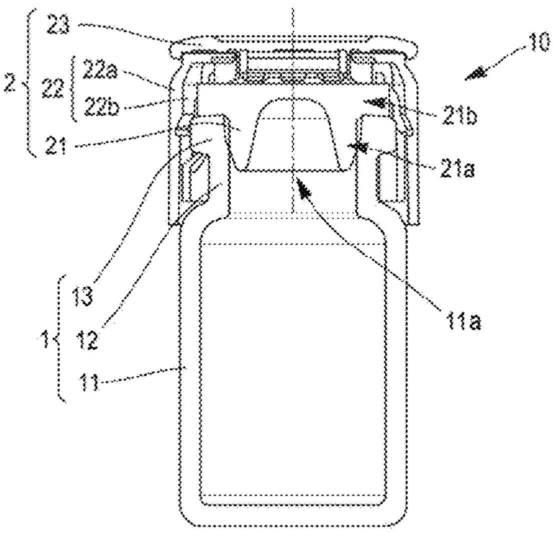
FIG. 3 shows an example of a pharmaceutical bottle, sealed by a cap.

Each cap 2 comprises a body 22 of cylindrical shape, which houses an elastomeric stopper 21 intended to close the neck 11*a* of the bottle 1 after the bottle 1 is filled. The cap 2 also comprises a closed upper cap 23 and has the function of closing and securely sealing the bottle 1 filled with a pharmaceutical product. Thus, the cap 2 may be formed of the body 22, which includes an external body 22*a* and a cage 22*b*, the upper cap 23, and the stopper 21 (FIG. 3), such as, for example, described in European Patent No. EP2464577 or French Patent Application Publication No. FR3098504. The foot 21*a* of the stopper 21 is adapted to be inserted into and to close the neck 11*a* of the bottle 1, while the head 21*b* of the stopper 21 is configured to bear against the rim 13 of the bottle 1, and to be supported by the cage 22*b*. The cage 22*b*, attached with no freedom of axial movement in the external body 22*a*, comprises flexible tongues enabling the cage 22*b* to be gripped under the rim 13 of the bottle 1 in order to secure the holding of the stopper 21 and thus to close the bottle 1.

Figure 4:
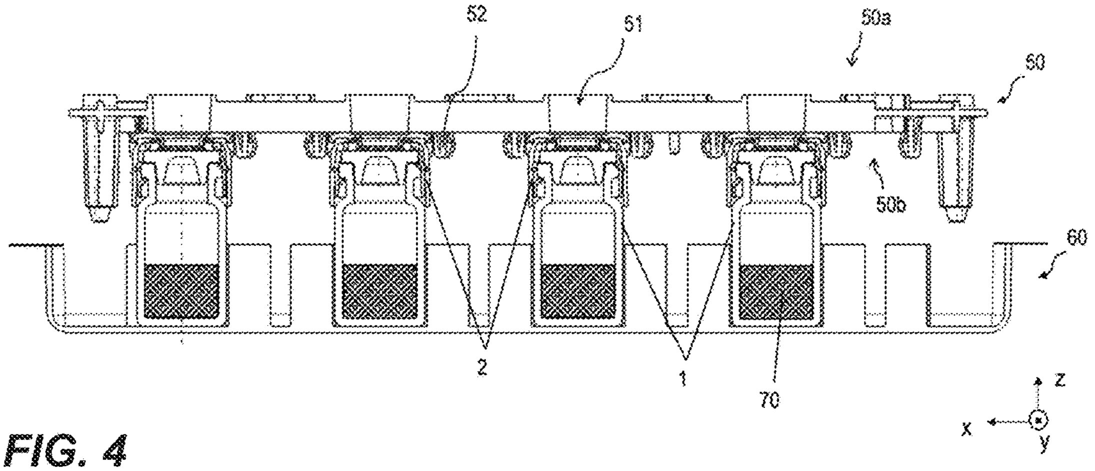
FIG. 4 shows a collective association between a plurality of caps and a plurality of bottles filled with a pharmaceutical liquid, the caps being suspended from a first tray and the bottles held in a second tray.

The context of the present disclosure is therefore situated in or just at the outlet of a production unit or line for filling and collecting groups of bottles for medical use. The bodies 11 of the bottles 1 are held on a conditioning or holding tray, referred to herein as the second tray 60, and successively undergo the step of filling the pharmaceutical product 70 and the step of closing by the caps 2, the caps 2 being held on the lower face 50*b* of the first tray 50 (FIG. 4). Of course, the number and the respective arrangement of the bottles 1 and of the caps 2 on their respective trays 50, 60 are compatible with this assembly.

Thus, there are bottles 1 arranged on the second tray 60 and sealed by caps 2, which themselves are suspended from the first tray 50. In a following step, it is therefore necessary to separate the caps 2 from the first tray 50, so as to be able to manipulate the filled and sealed bottles 1 individually or collectively.

Figure 5:
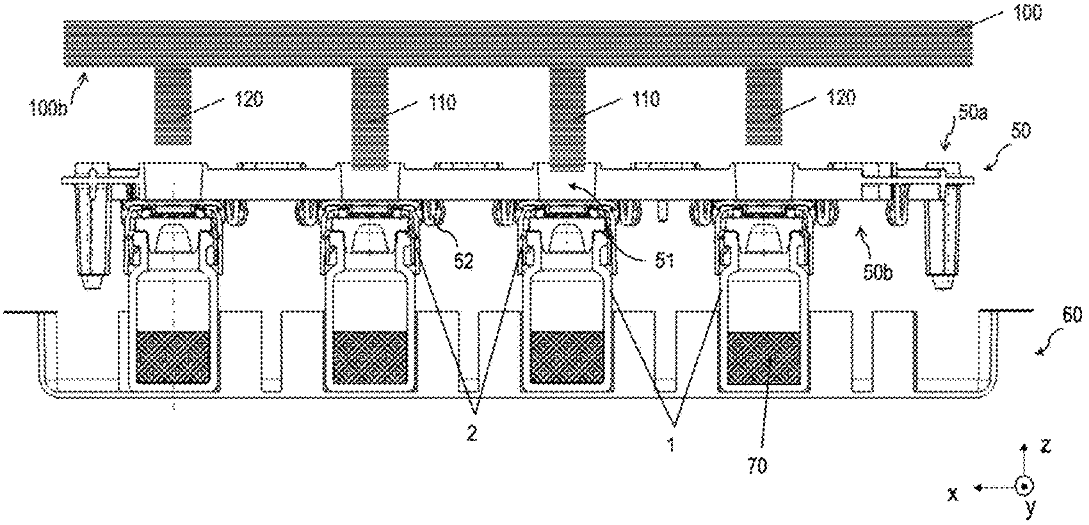
FIG. 5 shows an unclipping plate of equipment according to the present disclosure, arranged above the first tray to which the caps are suspended.

Returning to the description of the equipment according to the present disclosure, the latter comprises an unclipping plate 100 provided, on a lower face 100*b*, with rods 110, 120 distributed according to the distribution pattern of the through openings 51 of the first tray 50. The unclipping plate 100 extends along a horizontal plane (x,y), parallel to an upper face 50*a* of the first tray 50; it is mobile along a vertical axis z, so that each rod 110, 120 can, by passing through a through opening 51, bear against the upper part 23 of a cap 2 gripped by an attachment system 52 (FIG. 5). By applying a specific bearing force against a cap 2, the first rod 110, 120 will move the cap 2 downwards and lead to its detachment or separation from the attachment system 52.

According to the present disclosure, certain rods of the unclipping plate 100, referred to herein as the first rods 110, have a first length along the vertical axis z and other rods, referred to herein as the second rods 120, have a second length less than the first length.

These two lengths allow the application of the bearing force to be sequenced, first by the first rods 110, then by the second rods 120, in order to successively separate a first group of caps 2 (opposite the first rods 110) and a second group of caps 2 (opposite the second rods 120). In this way, it is possible to limit the total force applied to the first tray 50, and the flexing of the tray is thus controlled.

Figure 6A:
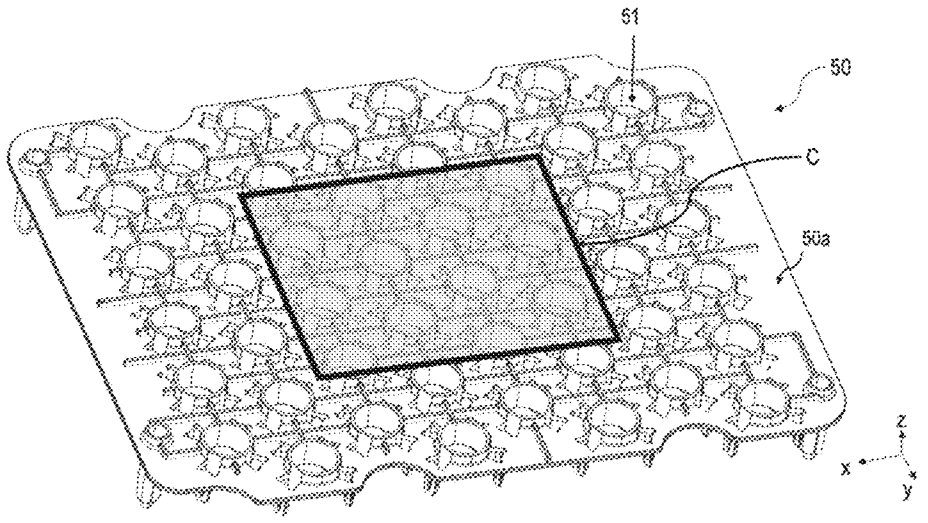
FIGS. 6A and 6B show two examples of regions (central or distributed uniformly) of a first tray, opposite which first rods or second rods (of different lengths) of the unclipping plate will be brought.

According to a first embodiment, the first rods 110 are located in a central region of the lower face 100*b* of the unclipping plate 100, intended to be located opposite the central region C of the first tray 50 shown in FIG. 6A. In this case, the second rods 120 are located in the peripheral region of the unclipping plate.

According to a second embodiment, the first rods 110 are located in the peripheral region of the lower face 100*b* of the unclipping plate 100, and the second rods 120 in the central region intended to be located opposite the central region C of the first tray 50 shown in FIG. 6A.

Figure 6B:
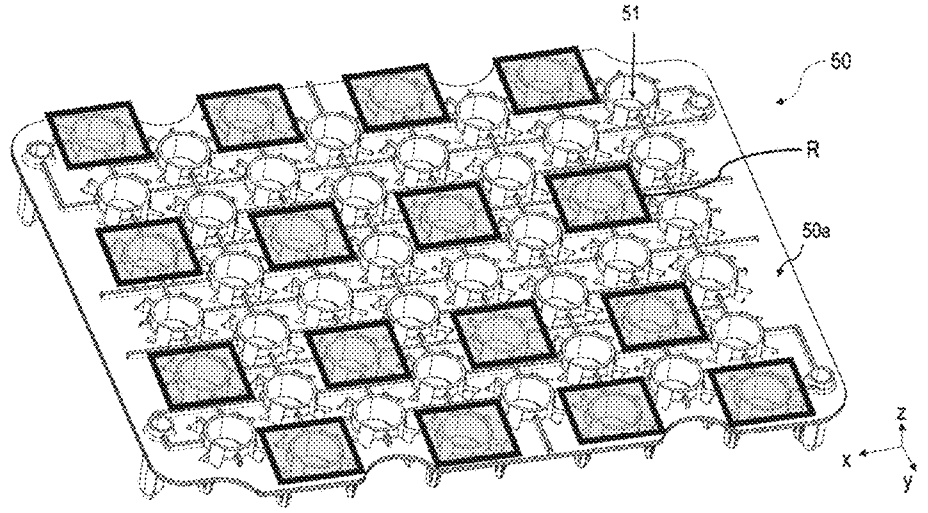

According to a third embodiment, the first rods 110 and second rods 120 are uniformly distributed over the lower face 100*b* of the unclipping plate 100. As an example, the first rods 110 or the second rods 120 can be located opposite the regions R of the first tray 50 shown in FIG. 6B.

For other distribution patterns of the openings 51 on the first tray 50, the first rods 110 and the second rods 120 can be arranged alternating with one another, still with a uniform distribution over the lower face 100*b* of the unclipping plate 100.

According to a fourth embodiment, the first rods 110 or the second rods 120 are arranged in an annular region defined between a central region and a peripheral region of the lower face 100*b* of the unclipping plate 100.

The unclipping plate 100 may, without limitation, comprise between nine (9) rods and one hundred (100) rods, a typical range of numbers of fastening systems 52 provided on first trays 50 of caps 2.

Advantageously, the first rods 110 (the longer rods) account for about 30% to 70% of the total number of rods, regardless of the embodiment considered. Advantageously, the first rods 110 account for 40% to 60% of the total number of rods, for example, about 50%.

The difference between the first length and the second length is between 0.5 mm and 2 mm. This difference in length is typically less than or equal to the displacement, along the axis z, which makes it possible to achieve the total separation between the cap 2 and the attachment system 52. In the case of a clip-type fastening system, this displacement is on the order of the distance, along the z-axis, between the claws 53 of the fastening system 52 and the stop 54.

When the total number of rods is large, the unclipping plate 100 may optionally comprise a third type of rods, with a third length, less than the second length. This allows a sequencing of separation of the caps 2 in three steps and increased control of the deflection of the first tray 50.

According to another option, all the rods of the unclipping plate 100 may have a different length. The rods can then be distributed randomly or in a certain order aiming at increasing or decreasing lengths from a point of the unclipping plate 100.

Advantageously, the ends of the rods 110, 120, which are intended to come into contact with and press against the upper parts 23 of the caps 2, have a flat surface to prevent damage to the upper parts 23. The area of this end surface is less than (but advantageously close to) the area of the through opening 51. The area of the through opening 51 typically represents between 40% and 100%, preferably between 50% and 90%, of the surface (in the (x,y) plane) of the upper part (or upper cap) 23 of the cap 2.

The equipment according to the present disclosure can have several types of unclipping plates 100, each having characteristics of rods 110, 120 (number, dimensions, distribution of the first and second rods) and a specific distribution pattern, and being adapted to the separation between caps 2 and a particular first tray 50. In the equipment, each unclipping plate 100 is therefore removable and interchangeable, to allow the use of the suitable plate 100 when caps 2 are to be detached from their tray 50.

Figure 7:
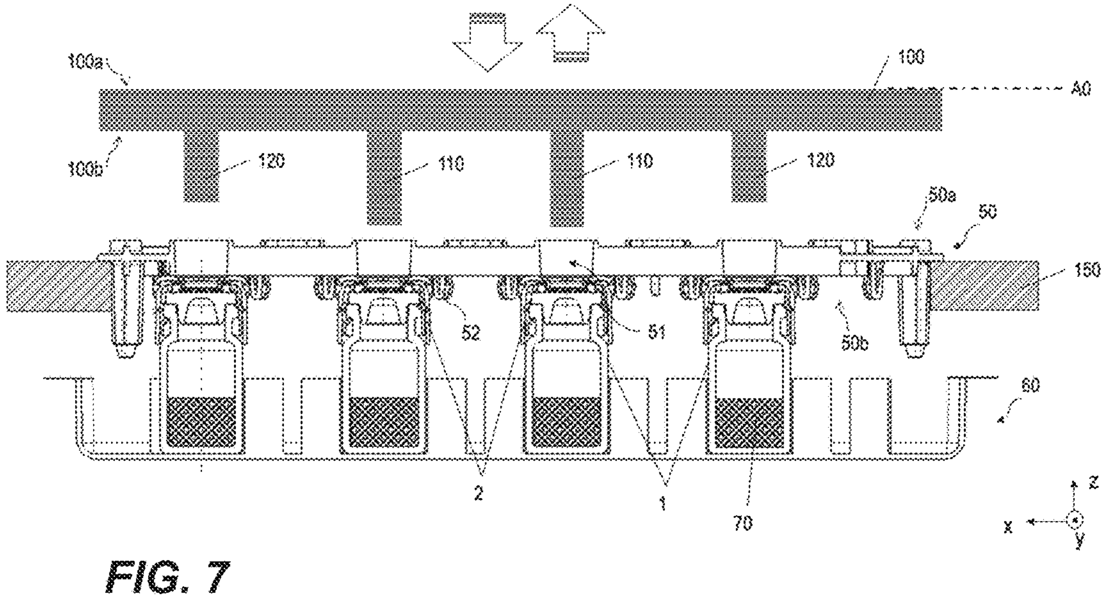
FIG. 7 shows equipment according to the present disclosure.

To manage the displacement of the unclipping plate 100, the equipment comprises a mechanical device suitable for lowering and raising the unclipping plate 100 along the vertical axis z (shown schematically by the arrows in FIG. 7). This device may involve a manually actuatable lever 160 (FIGS. 9A and 9B), or preferably a pneumatic or controllable pneumatic cylinder.

A support 150 for holding the first tray 50 parallel to the horizontal plane (x,y), and therefore parallel to the unclipping plate 100, is also required. This support 150 may be either part of the equipment according to the present disclosure, or part of other equipment, for example, present on the collective filling and sealing line of the bottles 1.

In the following description of the separation method according to the present disclosure, it will be seen that this support 150 can be fixed and hold the first tray 50 immobile, or it can be mobile and allow a vertical movement of the first tray 50 to be applied toward the unclipping plate 100, that is to say a rectilinear upward movement.

The present disclosure also relates to a method for separating the caps 2 from the first tray 50 by means of the equipment described above.

The method comprises a first step a) corresponding to the collective association of the caps 2 on bottles 1 to seal them after their filling with a pharmaceutical product 70. At the end of this step a), each cap 2 is attached to a bottle 1 and is also suspended from the first tray 50 via an attachment system 52. The bottles 1 are held on the second tray 60.

Figure 8A:
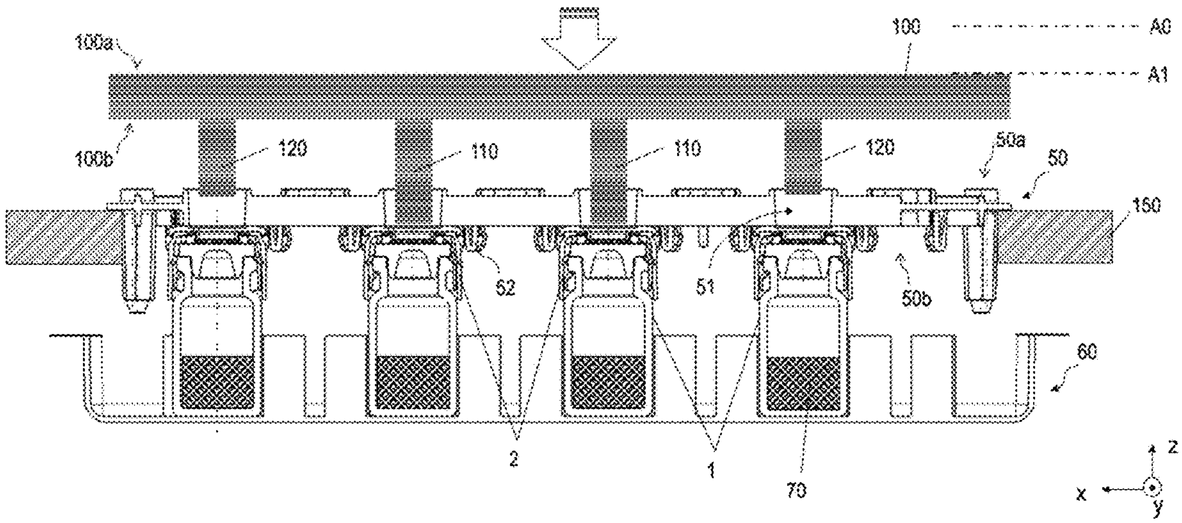
FIGS. 8A and 8B show two steps of the separation method according to the present disclosure.

The following step b) involves a first displacement of the unclipping plate 100, downward along the vertical axis z, from an initial height A0 to a first height A1 making it possible to bring the first rods 110 into contact with the upper parts 23 of the opposite caps 2 (first group of caps 2). At this first height A1, the second rods 120, shorter than the first rods 110, do not touch the upper parts 23 of the opposite caps 2 (second group of caps 2). This is shown in FIG. 8A.

Figure 8B:
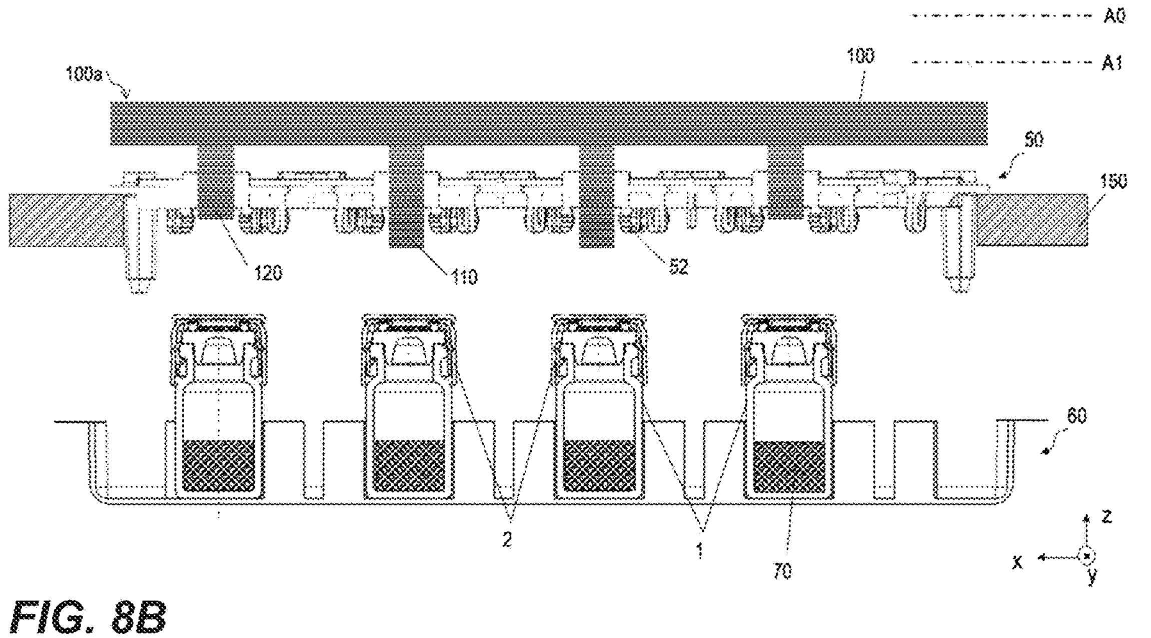

According to a first variant, the support 150 to hold the first tray 50 parallel to the horizontal plane (x,y) is fixed. The method then comprises, after step b), a step c) of continuing the first displacement of the unclipping plate 100 downward, along the vertical axis z. During this step, the first tray 50 is held immobile while the second tray 60 is able to deform or move vertically downward until separation between the first tray 50 and the caps 2 of the first and second group is attained (FIG. 8B).

Figure 9A:
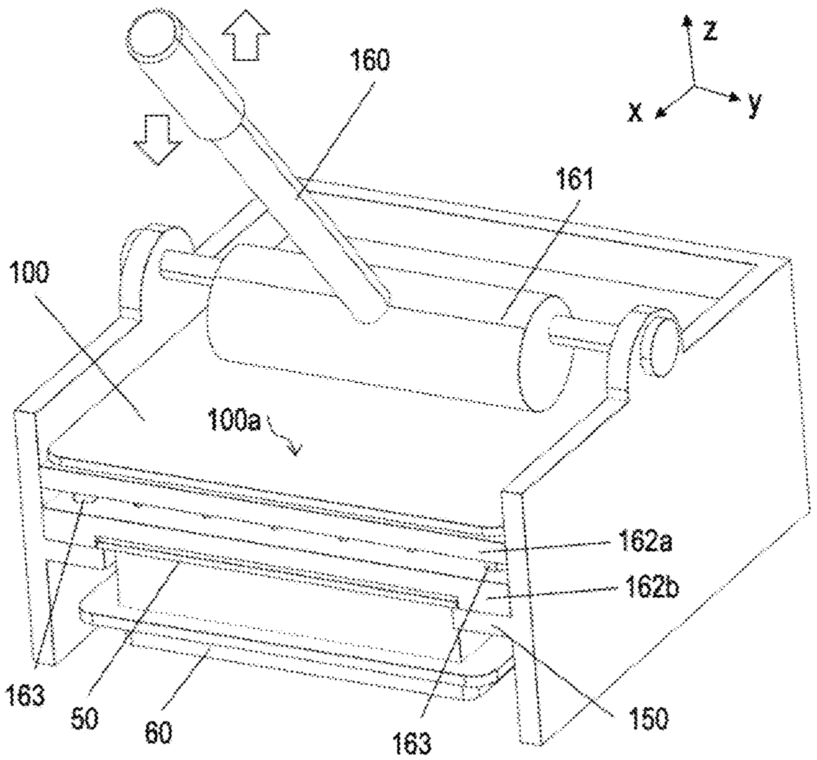
FIGS. 9A and 9B show an example of equipment according to the present disclosure.
Figure 9B:
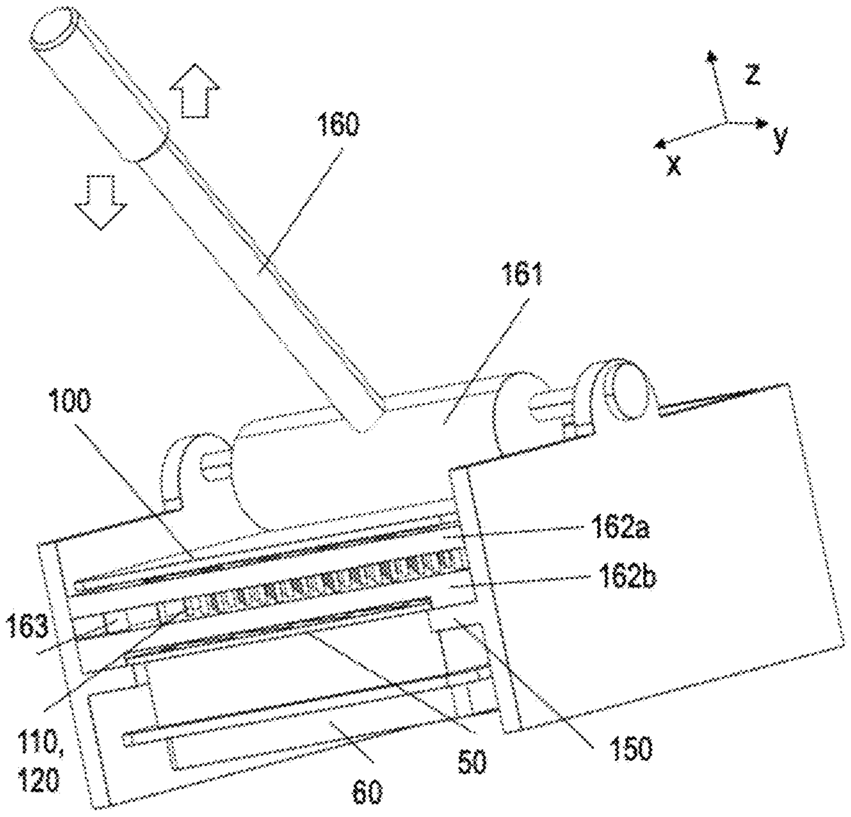

Equipment according to the present disclosure, making it possible to implement this first variant of the method, is shown in FIGS. 9A and 9B. A lever 160 is connected to a roller 161 rotatable about an off-center axis. The roller 161 is in contact with the upper face 100*a* of the unclipping plate 100. The downward actuation of the lever 160 makes it possible to lower the unclipping plate 100. The upward actuation allows the unclipping plate 100 to rise. The raising of the plate 100, when the roller 161 applies no pressure force, is made possible by a system of springs 163, arranged between two plates 162*a*, 162*b* having holes (to allow the passage of the rods 110, 120). The lower plate 162*b* arranged on the support 150 is fixed, while the upper plate 162*a* is mobile along the axis z. In this example, the first tray 50 is arranged on the support 150 and remains immobile. The second tray 60 is at liberty to move downward as soon as the caps 2 are separated from the first tray 50. The assembly formed by the unclipping plate 100 and the two plates 162*a*, 162*b* with holes is removable and can be replaced, according to the characteristics of the first tray 50 (number of supported caps, distribution pattern, etc.).

A damping material can be provided on a landing surface arranged under and at a distance (typically less than 5 cm) from the second tray 60 at the start of step c), so as to attenuate the impact of the second tray 60 or of the bottles 1 (if their bottom protrudes from the bottom of the second tray 60) on the landing surface. The damping material may, for example, be made of elastomer.

Alternatively, the second tray 60 can be held by a mobile member (not shown) that allows the second tray 60 to lower as a function of the bearing force applied by the rods 110, 120.

According to a second variant of the method, the support 150 that holds the first tray 50 parallel to the horizontal plane (x,y), is mobile. The method then comprises, after step b), a step c') corresponding to a displacement of the first tray 50 (referred to as a second displacement), upward along the vertical axis z. During this step, the unclipping plate 100 is kept immobile at the first height A1, and the second tray 60 is also held immobile. The second displacement induces a sequential bearing of the first rods 110 and then of the second rods 120 on the caps 2 of the first and of the second group, respectively, until the separation between the first tray 50 and the set of caps 2 is attained.

According to one of the variants described, the caps 2 are separated from the first tray 50 and secured to the bottles 1, which are collectively held in the second tray 60.

At the end of step c) or c'), the sealed bottles 1 held on the second tray 60 optionally may be arranged in a conditioning tank.

At this stage, conventional steps for conveying and conditioning full and sealed bottles 1 can be carried out.

The separation equipment according to the present disclosure and the associated method allow an effective and less constraining detachment of the caps 2 for the first tray 50, which can advantageously be reconditioned for reuse. The separation sequencing in two or more steps, due to the rods 110, 120 of different lengths, causes controlled deflection of the first tray 50 and limits the bearing force applied by the unclipping plate 100.

Naturally, the present disclosure is not limited to the embodiments and examples that have been described, and it is possible to add alternative embodiments thereto without departing from the scope of the invention as defined by the claims.

What is claimed is:

1. Equipment for separating caps from a tray after the caps have been attached to bottles to seal the bottles, the tray comprising a plurality of fastening systems, each fastening system being configured to hold a cap and being arranged on a lower face of the tray, and a through opening centered on each fastening system, the plurality of through openings being distributed over the tray according to a distribution pattern, the equipment comprising:

an unclipping plate comprising a plurality of rods distributed on a lower face of the unclipping plate according to the distribution pattern, the unclipping plate extending in a horizontal plane parallel to an upper face of the tray, and the unclipping plate being mobile along a vertical axis such that each rod of the plurality of rods can pass through an opening of the plurality of through openings, wherein first rods of the plurality of rods have a first length along the vertical axis and second rods of the plurality of rods have a second length less than the first length.

2. The equipment of claim 1, wherein the first rods are located in a central region of the lower face of the unclipping plate and the second rods are located in a peripheral region of the lower face of the unclipping plate.

3. The equipment of claim 1, wherein the first rods are located in a peripheral region of the lower face of the unclipping plate and the second rods are located in a central region of the lower face of the unclipping plate.

4. The equipment of claim 1, wherein the first rods and the second rods are disposed on the lower face of the unclipping plate according to a uniform distribution relative to one another.

5. The equipment of claim 4, wherein the uniform distribution is an alternating distribution.

6. The equipment of claim 1, wherein the first rods represent between 30% and 70% of all rods of the plurality of rods.

7. The equipment of claim 1, wherein a difference between the first length and the second length is between 0.5 mm and 2 mm.

8. The equipment of claim 1, further comprising a mechanical device configured to lower the unclipping plate along the vertical axis, the mechanical device comprising a manually actuatable lever, a controllable pneumatic or an electric cylinder.

9. The equipment of claim 8, wherein the mechanical device comprises the manually actuatable lever.

10. The equipment of claim 8, wherein the mechanical device comprises the controllable pneumatic or the electric cylinder.

11. The equipment of claim 1, further comprising a support for holding the tray parallel to the horizontal plane.

12. The equipment of claim 11, wherein the support is fixed and configured to immobilize the tray.

13. The equipment of claim 11, wherein the support is mobile and configured to move the tray vertically toward the unclipping plate.

14. The equipment of claim 1, wherein the unclipping plate comprises between nine rods and one-hundred rods.

15. The equipment of claim 1, further comprising a plurality of removable and interchangeable unclipping plates adapted to different trays.

16. A method for separating caps from a tray, the method comprising:

associating each of the caps with a respective bottle and sealing each cap of the caps to the respective bottle, each of the caps being held in the tray, and the bottles being held in an additional tray;

displacing an unclipping plate downward along a vertical axis to a first height to bring first rods of the unclipping plate into contact with upper parts of the caps; and continuing to displace the unclipping plate downward along the vertical axis while holding the tray immobile, the additional tray being vertically moveable until a separation between the caps and the tray; or displacing the tray upward along the vertical axis while holding the unclipping plate immobile at the first height and while holding the additional tray immobile until the separation between the caps and the tray.

* * * * *